United States Patent [19] | [11] 4,264,341
Kaufmann et al. | [45] Apr. 28, 1981

[54] METHOD OF RADIOACTIVE OFFGAS FILTRATION AND FILTER REGENERATION AND DEVICE FOR IMPLEMENTING THE METHOD

[75] Inventors: Friedrich Kaufmann, Karlsruhe-Waldstadt; Siegfried Weisenburger, Au; Herbert Koschorke, Stutensee-Friedrichstal; Hartmut Seiffert, Karlsruhe, all of Fed. Rep. of Germany

[73] Assignee: Kernforschungszentrum Karlsruhe GmbH, Karlsruhe, Fed. Rep. of Germany

[21] Appl. No.: 923,891

[22] Filed: Jul. 12, 1978

[30] Foreign Application Priority Data

Jul. 12, 1977 [DE] Fed. Rep. of Germany ....... 2731327

[51] Int. Cl.[3] .............................................. B01D 46/04

[52] U.S. Cl. .......................................... 55/96; 55/98; 55/269; 55/523; 55/DIG. 9; 134/2; 134/5; 134/7; 55/220

[58] Field of Search ..................... 55/98, 96, 242, 268, 55/269, 512, 523, 295, 233, 220; 65/DIG. 9, 27; 432/2; 134/2, 5, 7, 25 R; 252/301.1 W

[56] References Cited

U.S. PATENT DOCUMENTS

| | | | |
|---|---|---|---|
| 770,787 | 9/1904 | Thompson | 55/242 |
| 2,267,918 | 12/1941 | Hildabolt | 55/523 |
| 3,557,536 | 1/1971 | Ririe | 55/269 |
| 3,808,775 | 5/1974 | Heller et al. | 55/269 |
| 3,810,348 | 5/1974 | Byers et al. | 55/233 |
| 3,924,030 | 12/1975 | Tatara et al. | 65/27 |
| 3,950,152 | 4/1976 | Guon | 55/96 |
| 4,033,117 | 7/1977 | Smith | 55/96 |
| 4,120,668 | 10/1978 | Fraley | 55/269 |

FOREIGN PATENT DOCUMENTS

| | | | |
|---|---|---|---|
| 1019373 | 2/1966 | United Kingdom . | |
| 363273 | 4/1971 | U.S.S.R. | 55/96 |

*Primary Examiner*—Norman Yudkoff
*Attorney, Agent, or Firm*—Spencer & Kaye

[57] ABSTRACT

Method and device for effecting radioactive offgas filtration by means of a mass of filter material, and filter material regeneration, at temperatures in excess of 500° C. in which substances to be filtered impinge on the filter material mass in at least one direction, filtration being effected by removing a layer of contaminated filter material in the direction opposed to the direction in which substances impinge on the filter material in order to remove the filtered substances for filter cleaning. Removal of the contaminated filter material is carried out by adding a fluxing agent to the filter material at operating temperatures for regenerating the filter material by means of a cleanup melt. This fluxing agent may be a glass frit, an alkali hydroxide or an alkali or alkaline earth metal salt.

10 Claims, 2 Drawing Figures

METHOD OF RADIOACTIVE OFFGAS FILTRATION AND FILTER REGENERATION AND DEVICE FOR IMPLEMENTING THE METHOD

BACKGROUND OF THE INVENTION

The invention relates to a method of filtering radioactive offgases and regenerating the filters at temperatures in excess of 500° C., in which, for cleaning the filters, the filtered substances are removed from the filters by removing the contaminated layer of filter material in the direction opposed to the direction of impingement of the offgases onto the filters.

Previously, filter candles made of porous ceramic materials or metal fiber fleece were used to retain the aerosol fraction of radioactive offgases with temperatures in excess of 500° C. at the point at which they were to be cleaned. However, especially in the solidification of high level waste in glass or ceramic matrices or glass-like or ceramic-like matrices, this technique did not prove to work satisfactorily in long time operation, but rather became the weak point in any facility requiring a filter system of this kind. As experiments went on, it became increasingly more difficult to blow back the filters until, finally, they had to be replaced.

In large scale drying steps, with correspondingly large offgas volumes of water vapor and non-condensable gases of the type needed in more recent designs of plants for the solidification of aqueous high level waste concentrates, there is also increased aerosol formation even in drip drying of the liquid.

SUMMARY OF THE INVENTION

The present invention therefore has the object of eliminating the disadvantageous of previous techniques in the solidification of high level waste in glass or ceramic matrices or in similar matrices and of ensuring longer service life for the filter systems previously regarded as weak points of a facility. The invention further provides a method for also removing, both from the offgas during filtration and from the filter material during filter regeneration, those substances which cannot be removed or whose removal is difficult in conventional filter systems by tapping, mechanical vibration or blowback.

It is another object of the invention to provide a device for the execution of the method, and which operates to either melt down the contaminated layer of filter material by applying energy, or to regenerate by means of a cleanup melt with the addition of a fluxing agent at operating temperature.

DETAILED DESCRIPTION OF THE INVENTION

Figure 1:
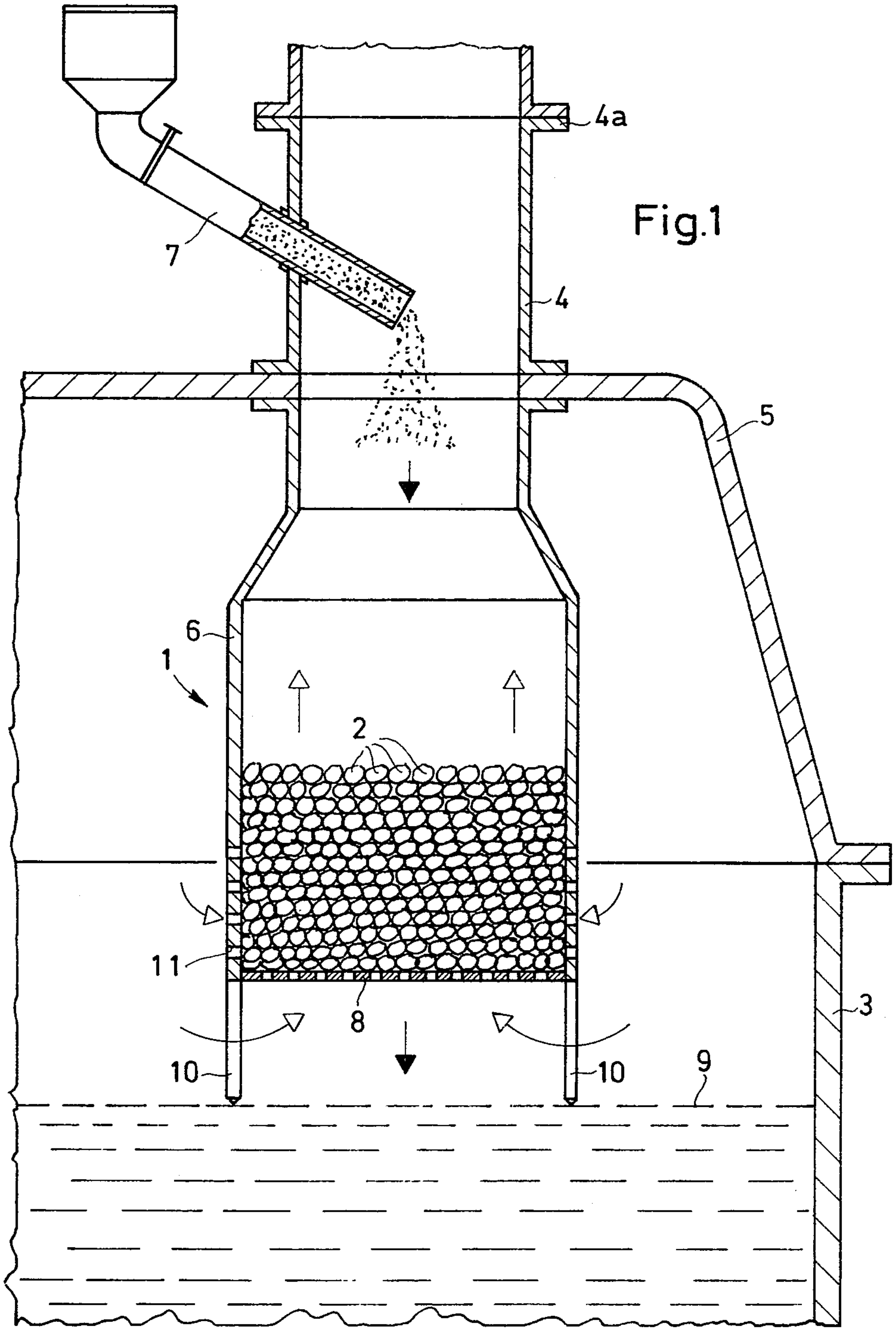
FIG. 1 is a schematic sectional view of a fixed bed filter.

In a preferred embodiment, the filter material consists of ceramic bodies. The fluxing agent may consist of glass frit, or alkali hydroxides, such as NaOH. Suitable alkali or alkaline earth salts can also be used as fluxing agents. The filter material, for instance, may be a ceramic granulate with either smooth or porous surfaces, depending on the fluxing agent used and the offgas composition encountered, or may be made up of spheres, grains or fragments. In a preferred embodiment the ceramic bodies mainly consist of 9 parts by weight of $Al_2O_3$, 8 parts by weight of $ZrO_2$, and 2.5 parts by weight of $SiO_2$.

According to the invention a device for performing the method includes an exchangeable fixed bed filter with a charge of ceramic filter material arranged within a furnace or a melting pot which can be covered with a hood. The filter mainly consists of a ceramic tube with an offgas duct equipped with a filling device, which can be closed, for the fluid fluxing agent, and a grate in the bottom part of the ceramic tube to hold the charge of ceramic filter material, the fixed bed filter being connected with an offgas system of the furnace or the melting pot, respectively, by means of the offgas duct so as to be detachable.

In a preferred embodiment of the device according to the invention, the ceramic tube has perforations or bores for the lateral passage of the offgas below the filling level of the ceramic filter material. In an advanced embodiment of the invention, another ceramic tube containing a heater is installed around the ceramic tube of the fixed bed filter, which other ceramic tube may also have perforations or bores.

The material which can successfully be used for the ceramic tubes is material with $Al_2O_3$ as the main constituent (above 90 wt.%) and containing a sizable amount of $Cr_2O_3$ (between 7 and 8 wt.%) and approx. 0.5 wt.% of $SiO_2$ and the same amount (approx. 0.5 wt.%) for the sum total of the fractions of $Fe_2O_3$, MgO, $Na_2O$ and $K_2O$. Other suitable materials are ceramic materials consisting mainly of $Al_2O_3$ and $ZrO_2$, the fraction of $Al_2O_3$ dominating (e.g., 45 to 51 wt.% of $Al_2O_3$ and 41 to 32 wt.% of $ZrO_2$), and 12 to 16 wt.% of $SiO_2$ with approx. 1% of other oxide components (e.g., $Na_2O$, $Fe_2O_3$, $TiO_2$, CaO, and MgO).

The special advantages of such a filter lie in the fact that the aerosols from the offgas with radioactive materials which precipitate on the ceramic filter material are flushed into the melting pot by means of the molten fluxing agent passing through the filter, and in the fact that the type and composition, respectively, of the fluxing agent can be selected in accordance with the composition of the melt. On the one hand, this assures that no additional foreign substances are dragged into the melt which could detract from the quality of the solidification product and, on the other hand, the cleaning action and the decontamination factor, respectively, of the filter above the melt is improved and the removal of those filters after replacement is simplified, because aerosols are already firmly bound in the filter as it cools.

The invention is explained in more detail below on the basis of an embodiment and the drawings without, however, being restricted to the information given in the example or the designs shown in the drawings.

EXAMPLE OF AN EMBODIMENT

A simulated high level waste (HLW) solution was sprayed through a nozzle onto the surface of the melt in an electrically heated ceramic melting pot at a rate of approx. 30 l/h and with a drop size of approx. 70 to 80 μm. The solids content of the HLW solution, expressed in oxides was 280 g/l, the amount of glass frit powder added, 173 g/l. In this specific case the glass frit consisted of borosilicate glass. The spray used was an inert gas (e.g., $N_2$ at a rate of approx. 8 std. $m^3/h$).

The temperature in the reaction space above the surface of the melt was approx. 600° to 800° C. After predrying some of the drying residue fell on the surface of the melt, the balance reaching the filter outside the spray jet together with the offgas. The aerosol loaded offgas entered the filter bed either laterally or from the bottom. The filter bed had a temperature of approx. 950° to 1100° C. The filter material used was a ceramic granulate with a composition of $Al_2O_3$:45.9 wt.%;
$ZrO_2$:40.8 wt.%
$SiO_2$: 12.3 wt.%;
$Na_2O$: 0.8 wt%;
$Fe_2O_3$: 0.08 wt.%;
$TiO_2$: 0.08 wt.%;
CaO and MgO: in trace amounts.

The ceramic spheres had diameters between 5 and 30 mm. The aerosols contained in the offgas were retained on the granulate coated with molten glass (viscosity approx. 80 poise), i.e., on the liquid molten glass film, and directly or indirectly returned or added to the melt with the melt continuously dripping from the filter bed. At intervals of 5 to 7 hours some 500 g of glass from the glass frit frit was added to the filter bed through a lock from the top. The cleaned offgas was then treated conventionally, i.e., to remove the aerosol residues (particle sizes $<1$ $\mu m$) the offgas was fed to a wet scrubber, next to a condenser and finally to a chemical offgas scrubber before being released into the atmosphere.

FIG. 1 is a schematic diagram of a fixed bed filter 1 with ceramic spheres 2 arranged within a ceramic melting pot 3 (not completely shown in the drawing) and an offgas duct 4 connecting the melting pot 3 with the offgas system (not shown). The fixed bed filter 1, which consists mainly of a ceramic tube 6 together with the offgas duct 4, a filling device 7, which can be closed, for the fluxing agent and a grate 8 to hold the filter material, e.g., the ceramic spheres 2, is arranged some 5 to 10 cm above the surface of the melt 9 and may be equipped with spacers 10 at the bottom. The offgas duct 4 is connected to the offgas system by a flange 4*a*.

Figure 2:
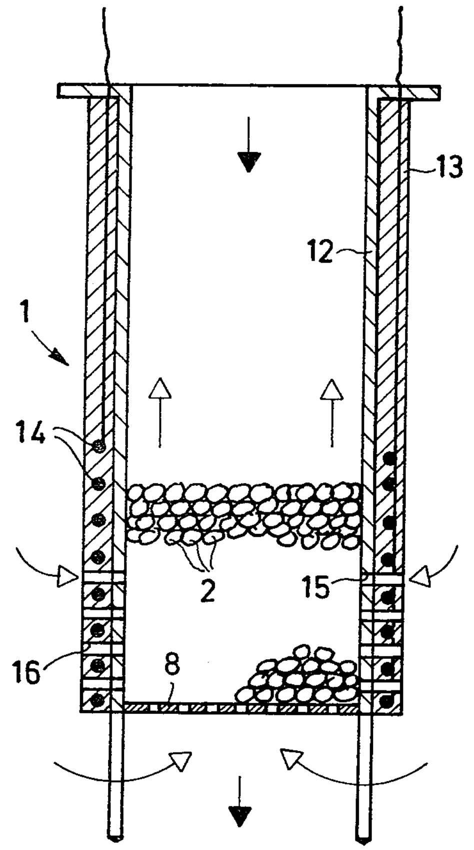
FIG. 2 is a sectional view of that part of the device which, in a preferred embodiment of the invention, is arranged within the furnace or melting pot.

FIG. 2 shows a preferred embodiment of that part of the device according to the invention which is arranged within the furnace or melting pot. The ceramic tube 12 containing the grate 8 with the charge 2 of ceramic filter bodies is surrounded by another ceramic tube 13. The wall of the tube 13 holds a heater 14, thus allowing the fixed bed filter 1 to be regenerated even if the temperature in the environment of the filter were to drop. For the case where the offgases penetrate the filter not only from the bottom but also from the side, the ceramic tube 12 is equipped with perforations 15, and the tube 13 also contains perforations or bores 16.

We claim:

1. A method for effecting radioactive offgas filtration by means of a mass of filter material, and filter material regeneration, at temperatures in excess of 500° C. in which substances to be filtered impinge on the filter material mass in at least one direction, comprising: using as the filter material ceramic bodies which consist essentially of 9 parts by weight $Al_2O_3$, 8 parts by weight of $ZrO_2$, and 2.5 parts by weight of $SiO_2$, and removing, in the direction opposed to the direction in which substances impinge on the filter material, a layer of contaminated filter material by adding a fluxing agent to the filter material at operating temperature for regenerating the filter material by means of a cleanup melt formed by the fluxing agent.

2. Method as claimed in claim 1 wherein the fluxing agent consists of glass frit.

3. Method as claimed in claim 1 wherein the fluxing wgent consists of alkali hydroxide.

4. Method as claimed in claim 1 wherein the fluxing agent consists of an alkali or alkaline earth salt.

5. A method for effecting radioactive offgas filtration by means of a filter material, and filter material regeneration, at temperatures in excess of 500° C. in which substances to be filtered impinge on the filter material mass in at least one direction, comprising: removing, in the direction opposed to the direction in which substances impinge on the filter material, a layer of contaminated filter material, by adding a fluxing agent selected from the group consisting of a glass frit, an alkali hydroxide, an alkali salt and an alkaline earth salt, to the filter material at operating temperature for regenerating the filter material by means of a cleanup melt formed by the fluxing agent.

6. Method as claimed in claim 5, wherein the ceramic bodies consists mainly of 9 parts by weight of $Al_2O_3$, 8 parts by weight of $ZrO_2$ and 2.5 parts by weight of $SiO_2$.

7. Device for effecting radioactive offgas filtration by means of a mass of filter material, and filter material regeneration, comprising an exchangeable fixed bed filter containing a charge of ceramic filter material arranged within a furnace or a melting pot closed by a hood, said filter comprising a ceramic tube with an offgas duct, a filling device for a fluxing agent, the filling device being associated with said duct and arranged to be closed, a grate installed in the bottom part of said ceramic tube to hold the charge of ceramic filter material, said fixed bed filter being detachably connected with an offgas system of the furnace or the melting pot by means of said offgas duct.

8. Device as claimed in claim 7 wherein said ceramic tube is provided with perforations or bores below the filling level of the ceramic filter material for lateral passage of the offgas.

9. Device as claimed in claim 7 wherein said filter comprises a further ceramic tube containing a heater arranged around said first-recited ceramic tube.

10. Device as claimed in claim 9 wherein said further ceramic tube is equipped with perforations or bores.

* * * * *